May 1, 1945.　　　R. R. CURTIS　　　2,375,085
BOOSTER PUMP SEAL CONSTRUCTION
Filed Jan. 30, 1943
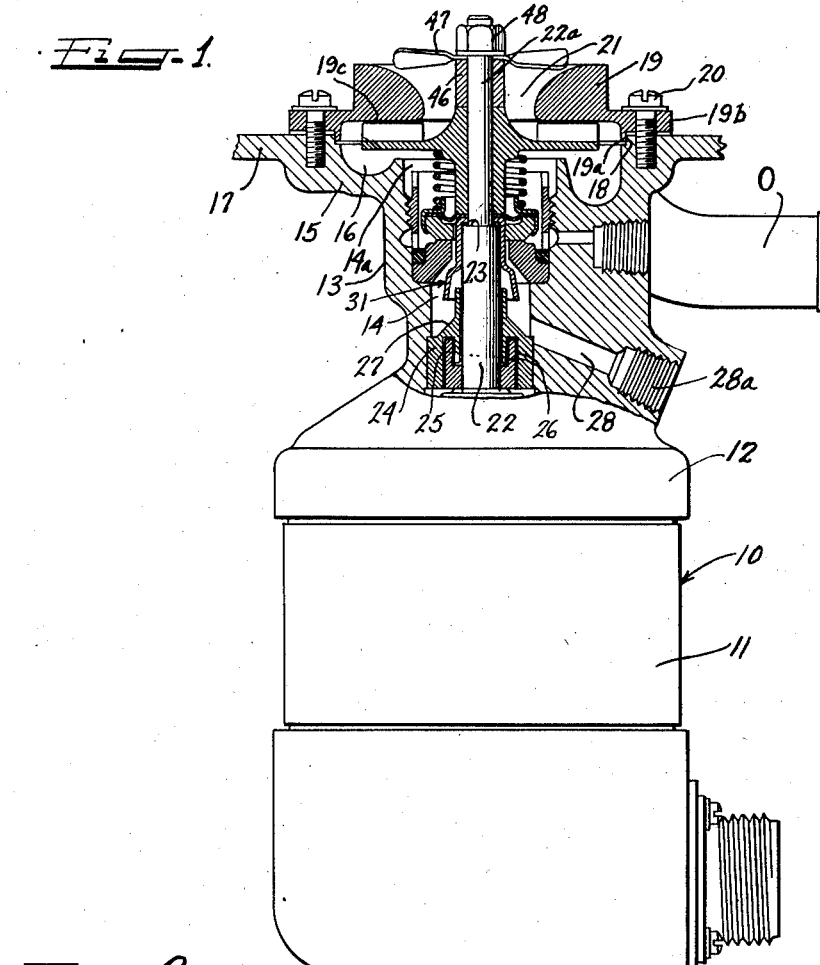
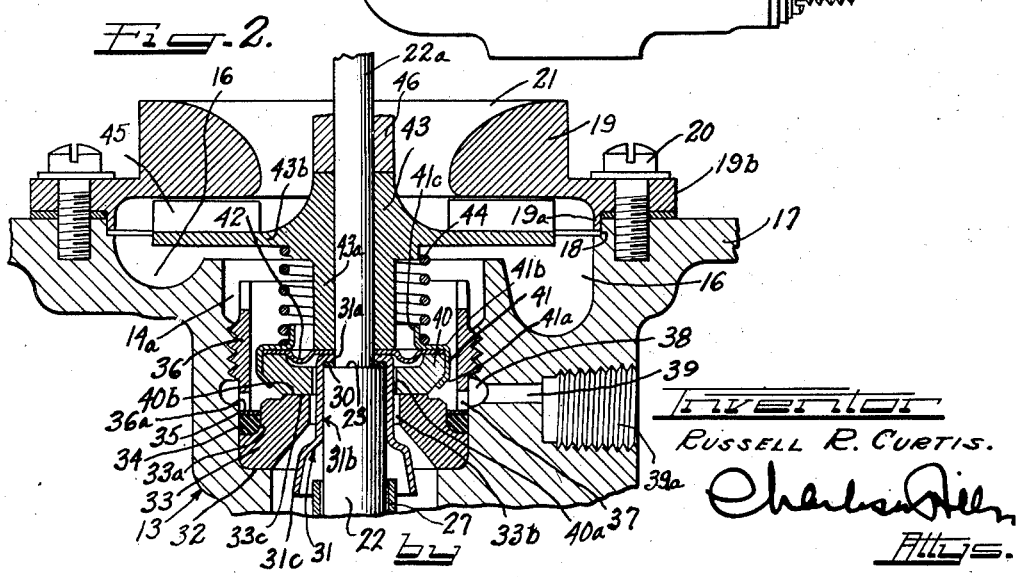
Inventor
RUSSELL R. CURTIS.

Patented May 1, 1945

2,375,085

UNITED STATES PATENT OFFICE 2,375,085

BOOSTER PUMP SEAL CONSTRUCTION

Russell R. Curtis, Dayton, Ohio, assignor to Curtis Pump Company, Dayton, Ohio, a corporation of Ohio Application January 30, 1943, Serial No. 474,199

4 Claims. (Cl. 103—111)

This invention relates to a seal construction especially adapted for centrifugal type pumps.

Specifically the invention relates to a seal assembly of the relatively rotating seal ring type adapted to be readily mounted in a pump shaft well to seal the well against leakage of fluid from the pumping portion of the assembly.

The invention will be hereinafter specifically described as embodied in a booster pump unit including a centrifugal type pump and an electric motor for driving the pump but it should be understood that the seals of this invention are not limited to such specific usage.

In accordance with the invention a shaft well is provided with a counterbored or otherwise enlarged end portion so that an annular shoulder is formed at the bottom of the counterbored or enlarged portion. A stationary seal ring, of graphitic carbon or other effective sealing material, is seated on this annular shoulder and a sleeve is threaded into the counterbore or enlarged portion for pressing against a resilient gasket disposed around the stationary seal ring to prevent leakage around the stationary seal ring. A rotating seal ring is disposed within this sleeve and is spring pressed into sliding face engagement with the stationary ring. The rotating ring can be composed of a metal such as, for example, nitralloy.

The pump drive shaft extends freely through both the stationary and rotating seal rings, but a flexible diaphragm has an inner peripheral portion sealed around the pump shaft, and an outer peripheral portion sealed around the rotating seal ring. This flexible diaphragm will prevent leakage along the shaft through the rings. With this construction the shaft may tilt or wobble during operation without unseating the sliding faces of the seal rings, since the diaphragm will merely flex to permit such movements of the shaft without imparting these movements to the rotating seal ring.

It is, then, an object of this invention to provide an inexpensive readily assembled efficient seal construction for shafts such as pump shafts.

A specific object of the invention is to provide a centrifugal type pump with a shaft well carrying stationary seal mechanisms and with a rotating seal mechanism connected to the pump shaft in said well through a flexible diaphragm.

A further object of the invention is to provide a centrifugal type booster pump having a central inlet, a peripheral pumping chamber, a central shaft well, a pump drive shaft extending freely through said well, an impeller on said shaft, and a seal construction in said well loosely embracing said pump shaft while preventing leakage from the impeller and pumping chamber to the portion of the well beyond the seal construction.

A still further object of this invention is to provide a shaft seal construction adapted to be readily mounted in a shaft well and including a flexible diaphragm clamped at the inner portion thereof around the pump shaft between the pump impeller and a flinger member.

Another specific object of this invention is to provide, in an electric motor driven centrifugal pump unit, a seal construction which will seal against leakage from the pump to the electric motor without being affected by axial or transverse movements of the drive shaft from the motor to the pump.

A further object of the invention is to provide a shaft seal which is not affected by axial movements or wobbling of the shaft.

Other and further objects of the invention will be apparent to those skilled in the art from the following detailed description of the annexed sheet of drawing which, by way of preferred example only, illustrates one embodiment of the invention.

On the drawing:

Figure 1 is a side elevational view, with parts broken away and shown in vertical cross section, of an electric motor driven booster pump unit including a seal construction according to this invention.

Figure 2 is an enlarged fragmentary vertical cross-sectional view, with parts in elevation, of a portion of the pump shown in Figure 1 better illustrating the seal construction of this invention.

As shown on the drawing:

In Figure 1 the reference numeral 10 designates generally an electric motor-centrifugal booster pump unit including a casing 11 for the electric motor. The casing has an end head 12 with an upstanding neck portion 13 defining a shaft well 14. An outturned portion 15 on the upper end of the neck 13 defines a portion of a pumping chamber 16. The head 12 includes an outturned flange 17 on the upper end thereof adapted for attaching the unit to a tank wall such as the bottom wall of a gasoline fuel tank.

The portion of the pumping chamber 16 defined by the outturned portion 15 of the head 12 is open topped and has a counterbore 18 therein for receiving the skirt 19a of a throat ring 19. The throat ring 19 is attached to the portion 15 by means of cap screws 20 which extend through a radial flange 19b on the ring into threaded engagement with the portion 15 around the pumping chamber 16. The throat ring 19 provides a central fluid inlet throat 21 to the pumping chamber 16. The chamber 16 is thus partially defined by the portion 15 of the cap 12 and by the bottom 19c of the throat ring 19.

A peripheral outlet O is provided for discharging fluid from the pumping chamber 16.

The electric motor in the casing 11 has a shaft 22 extending through the well 14. The well 14 is counterbored to provide an enlarged upper end portion 14a. The shaft 22 has a reduced end 22a extending from a level intermediate the counterbored portion 14a of the well through the inlet 21 of the throat ring 19 to terminate at a level above the throat ring 19. A shoulder 23 is thus formed between the reduced end portion of the shaft 22a and the unreduced portion of the shaft. This shoulder is at a level intermediate the ends of the counterbored portion 14a of the well.

A flame trap construction including a member 24 fixedly seated in the well 14 and a member 25 secured to the shaft 22 provides a tortuous path 26 connecting the interior of the casing 11 with the well 14. This tortuous path will not act as a fluid seal, but will prevent propagation of flame so that an explosion from a sparking motor in the casing 11 will not be able to propagate flame into the well 14. The member 24 of the flame trap has a conical upper portion 27 flaring outwardly into communication with a port hole 28 in the neck portion 13. The outer end of the port hole 28 can be enlarged and internally threaded as at 28a for receiving a drain line so that any fluid entering the well 14 can be drained through the port hole 28. In addition air can be vented through the tortuous path 26 from an intake provided in the motor casing for sweeping out any accumulated fluid in the well 14.

As better shown in Figure 2, a resilient washer or gasket 30 is mounted on the shoulder 23 of the drive shaft 22 and a flinger member 31, apertured to snugly fit around the reduced end 22a of the drive shaft, has an end wall portion 31a seated on top of the washer 30 together with a cylindrical side wall portion 31b snugly surrounding the upper end of the drive shaft 22. The flinger 31 has an outwardly flaring skirt portion 31c partially overlapping the upper end of the flame trap member 27 which member 27 freely receives the shaft 22 therethrough. This flinger 31 rotates with the shaft and is effective to fling any fluid leaking into the well 14 outwardly around the side walls of the well so that it will drain into the port hole 28, shown in Figure 1.

The enlarged end portion 14a of the well is bottomed by an annular shoulder 32 which receives a stationary seal ring 33 preferably composed of graphitic carbon. This seal ring 33 snugly engages the side wall of the enlarged portion 14a as well as the shoulder 32 but to insure against leakage around the stationary seal ring, a resilient gasket or washer 34 is seated in a peripheral recess 33a provided around the upper portion of the seal ring. This washer 34 can be covered with a metal or fiber washer 35.

A metal sleeve 36 is threaded into the enlarged well portion 14a and has a bottom edge 36a thrusting against the washer 35. This bottom edge 36a has a series of recesses 37 therein so that the interior of the sleeve 36 will communicate with an annular groove 38 around the well portion 14a at about the level of the upper end of the stationary seal ring 33. A port hole 39 is provided in the neck portion 13 to communicate with the groove 38 and this port hole can be enlarged and internally tapped as at 39a for receiving a drain line. Fluid entering the sleeve 36 can thus be drained out of the pump unit.

The stationary seal ring 33 has a central aperture 33b large enough to freely accommodate the flinger 31.

A rotating seal ring 40 preferably composed of metal such as nitralloy has a central aperture 40a freely receiving the flinger 31. The rotating seal ring 40 has a bottom annular face 40b cooperating with a top annular face 33c of the stationary seal ring. Sliding face to face engagement of the rings along their cooperating faces 40b and 33c maintains a seal.

The rotating seal ring 40 receives a cup or retainer 41 therearound which is spun inwardly at the lower end 41a thereof to be fixedly attached to the ring.

The cup 41 includes a top wall 41b and an upstanding flange or collar 41c.

A flexible diaphragm 42 composed of plastic sheet material, such as fabric impregnated with synthetic rubber, or any suitable flexible sealing membrane has an outer marginal portion thereof clamped between the rotating ring 40 and the top wall 41b of the cup 41 together with an inner marginal portion clamped between the top wall 31a of the flinger 31 and the bottom end of the hub 43a of an impeller 43 mounted on the shaft portion 22a. Fabric impregnated with synthetic rubber such as "Neoprene" is preferred for the diaphragm 42 since it operates efficiently at very low temperatures existing at high altitudes which temperatures may freeze other flexible materials and render them ineffective.

The diaphragm 42 has an intermediate bowed portion which can be deflected into and out of a recess provided in the top portion of the rotating seal ring 40.

A coiled spring 44 is disposed around the collar 41c of the cup and is bottomed on the wall 41b of the cup. The other end of the coiled spring abuts a flange portion 43b of the impeller 43. This flange portion 43b carries upstanding pumping vanes 45 underlapping the throat ring 19 for propelling fluid from the inlet 21 to the pumping chamber 16 and thence through the outlet O.

A spacer sleeve 46 is disposed around the shaft portion 22a above the impeller 43 and receives thereon a propeller 47 as best shown in Figure 1. The upper end of the shaft portion 22 is threaded and receives a nut 48 for holding the entire assembly on the shaft. Thus this nut 48, when tightened on the shaft portion 22a, will compress the washer 30 against the shoulder 23, will force the wall 31a of the flinger 31 downwardly on top of the washer, will force the impeller hub 43a downwardly on top of the inner end of the diaphragm 42 for clamping this inner end of the diaphragm between the flinger and impeller hub, and will clamp the hub of the propeller 47 between the sleeve 46 and the nut.

The impeller 43 and sleeve 46 can be keyed to the shaft portion 22a and the hub of the propeller 47 can, in turn, be keyed to the sleeve 46 so that relative rotating movements between the shaft and these members will not occur.

The spring 44 urges the rotating sealing ring 40 into sliding seating relation with the sealing face of the stationary seal ring. The spring, in addition, aids the spun portion 41a of the cup in clamping the outer marginal portion of the diaphragm against the rotating seal ring.

The construction is such that the diaphragm 42 is in sealed relation to the shaft and to the rotating seal ring but the shaft can move axially or transversely without moving the seal ring. The diaphragm is adapted to flex by virtue of its intermediate bowed portion, and any wobbling or axial movement of the shaft will not be imparted to the rotating seal ring 40.

Fluids leaking from the pump chamber or impeller into the well portion 14a are prevented from entering the well portion 14 since the diaphragm 42 seals the passages provided by the apertures of the seal ring and since the sliding face to face engagement between the seal rings seals against leakage of fluid inwardly from the peripheries of the seal rings. Any liquid which does leak into the chamber portion 14a of the well can, of course, be drained through the port hole 39.

In the event, however, that fluid does enter the well portion 14 under the seal construction, this fluid will be flung out of the well by the flinger 31 into the port 28. As explained above, air can be used as a scavenging medium to further flush out liquid from the well portion 14.

From the above descriptions it will be understood that the seal construction of this invention is readily assembled in the well portion 14a and on the drive shaft 22. Any axial or transverse movements of the drive shaft relative to the well walls are permitted without displacement of the sealing engagement between the stationary and rotating seal rings because the flexible diaphragm will absorb such movements of the shaft.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a centrifugal type pump having a central inlet, a peripheral pumping chamber, a central shaft well, a drive shaft extending through said well and having a shoulder in the well, and a hub on said shaft adjacent the shoulder, the improvements of a seal construction comprising a stationary seal member seated in said well in sealed relation therewith and receiving said shaft freely therethrough, a rotating seal member in said well in sliding face to face engagement with said stationary seal member and receiving said shaft freely therethrough, a flexible diaphragm having an inner marginal portion sealingly clamped between said hub and said shoulder of the shaft, a readily deformable intermediate portion, and an outer peripheral portion overlying said rotating seal member, a cup member overlying the outer marginal portion of the diaphragm and having a skirt clamped onto said rotating seal member for clampingly sealing the outer marginal portion of the diaphragm on the rotating seal member, and a coiled spring held under compression between said hub and said cup member for urging the rotating seal member against the stationary seal member.

2. In combination with a casing providing a shaft well and a shaft rotatably mounted therein, a seal construction comprising a stationary seal member sealingly seated in said shaft well and receiving said shaft freely therethrough, said stationary seal member having an annular end face, a rotating seal member in said well receiving said shaft freely therethrough and having a first annular end face for riding on said end face of the stationary seal member in sealing contact therewith together with an opposed recessed end face having a central recess bounded by an annular raised rib portion with a flat end wall, a flexible diaphragm having an inner marginal portion sealingly engaging said shaft, a bowed intermediate portion in said recess of the rotating seal member, and an outer marginal portion overlying the end wall of said rib on the rotating seal member, a collared retainer having an end wall overlying the outer marginal end portion of the seal member together with a skirt embracing the rotating seal member and clamped thereon to sealingly hold said outer marginal end portion of the diaphragm against the rotating seal member, and a spring surrounding the collar of the retainer acting on the retainer end wall to urge the rotating seal member against the stationary seal member whereby said shaft can move axially and transversely relative to the seal members without disturbing the sliding face to face relation thereof.

3. In a centrifugal type pump having a shaft well with an enlarged end portion bottomed by an annular shoulder and a shaft extending through said well, the improvement of a seal construction comprising a seal member seated on said shoulder of the well having a recess around the periphery thereof extending inwardly from the end face thereof remote from the seated end face and cooperating with the shaft well to form a groove, a resilient packing ring in said groove, a sleeve threaded in the enlarged end portion of the well thrusting against the packing ring to deform the ring into sealing relation with the well and seal member, said seal member having a central aperture freely receiving said shaft therethrough, a second seal member having a first end face in sliding face engagement with the recessed end face of the first mentioned seal member and also having an aperture freely receiving said shaft therethrough, a flexible diaphragm overlying said second seal member, means clampingly engaging the inner marginal portion of said diaphragm to sealingly connect the shaft and diaphragm, and means clampingly engaging the outer marginal portion of said diaphragm to sealingly connect the second seal member and diaphragm, said diaphragm having an unobstructed intermediate portion adapted to be readily flexed for accommodating relative axial and transverse movements between the shaft and seal member.

4. In a pump having a shaft well, a drive shaft extending through said well, and a pump impeller on said drive shaft, the improvement of a seal construction comprising a stationary seal member seated in said well, means sealing said stationary seal member relative to the well, a rotating seal member in said well, said stationary and rotating seal members having central apertures freely receiving said drive shaft, a flinger member on said drive shaft, a flexible diaphragm around said drive shaft clamped between said flinger member and said pump impeller, a cup member on said rotatable seal member clamping the outer marginal portion of said diaphragm against the rotating seal member, a spring compressed between the impeller and said cup member urging the rotating seal member against the stationary seal member, a flame trap construction in said well spaced from said stationary seal member and said flinger, and said well having a drain outlet between said stationary seal member and said flame trap construction whereby said flinger can throw liquid leaking past the stationary and rotating seal members into said drain outlet.

RUSSELL R. CURTIS.